United States Patent
Barais et al.

(10) Patent No.: US 11,794,886 B2
(45) Date of Patent: Oct. 24, 2023

(54) HYBRID ROTORCRAFT HAVING AT LEAST ONE PUSHER OR PULLER PROPELLER, AND AN ASSOCIATED PILOTING METHOD

(71) Applicant: AIRBUS HELICOPTERS, Marignane (FR)

(72) Inventors: Olivier Barais, Ensues la Redonne (FR); Paul Eglin, Roquefort la Bedoule (FR); Jerome Geneix, Miramas (FR)

(73) Assignee: AIRBUS HELICOPTERS, Marignane (FR)

( * ) Notice: Subject to any disclaimer, the term of this patent is extended or adjusted under 35 U.S.C. 154(b) by 35 days.

(21) Appl. No.: 17/099,064

(22) Filed: Nov. 16, 2020

(65) Prior Publication Data

US 2021/0163125 A1 Jun. 3, 2021

(30) Foreign Application Priority Data

Nov. 29, 2019 (FR) ...................................... 1913448

(51) Int. Cl.
*B64C 27/22* (2006.01)
*B64C 27/26* (2006.01)
*B64C 27/82* (2006.01)
*B64D 27/24* (2006.01)
*B64D 27/02* (2006.01)

(52) U.S. Cl.
CPC .............. *B64C 27/22* (2013.01); *B64C 27/26* (2013.01); *B64C 27/82* (2013.01); *B64D 27/24* (2013.01);

(Continued)

(58) Field of Classification Search
CPC .... B64C 27/22; B64C 27/26; B64C 2027/026
See application file for complete search history.

(56) References Cited

U.S. PATENT DOCUMENTS

2009/0321554 A1 12/2009 Roesch
2010/0243792 A1 9/2010 Queiras et al.
(Continued)

FOREIGN PATENT DOCUMENTS

CN 108750092 A * 11/2018
CN 108750092 A 11/2018
(Continued)

OTHER PUBLICATIONS

John Watkinson, Art of the Helicopter, 2004 (Year: 2004).*
(Continued)

*Primary Examiner* — Timothy D Collins
*Assistant Examiner* — Justin Michael Heston
(74) *Attorney, Agent, or Firm* — Brooks Kushman P.C.

(57) ABSTRACT

A rotorcraft including a first power plant, at least one main rotor participating at least in providing lift for the rotorcraft in the air, and at least one tail rotor carried by a tail boom, the first power plant including at least one engine. In accordance with the invention, the rotorcraft includes: at least one pusher or puller propeller independent from the at least one main rotor, the at least one pusher or puller propeller participating at least in providing propulsion or traction for the rotorcraft; a second power plant including at least one electric motor; and at least one control member configured to generate a control setpoint or instruction for controlling the at least one electric motor.

16 Claims, 2 Drawing Sheets

(52) U.S. Cl.
CPC .......................... *B64C 2027/8236* (2013.01); *B64D 2027/026* (2013.01)

(56) References Cited

U.S. PATENT DOCUMENTS

| | | | | |
|---|---|---|---|---|
| 2015/0100181 | A1* | 4/2015 | Strauss | ................... B64C 27/14 |
| | | | | 701/3 |
| 2017/0225794 | A1 | 8/2017 | Waltner | |
| 2020/0307779 | A1* | 10/2020 | Ross | ....................... B64C 27/26 |

FOREIGN PATENT DOCUMENTS

| | | |
|---|---|---|
| EP | 2233396 A1 | 9/2010 |
| EP | 2690011 A1 | 1/2014 |
| EP | 3141478 A1 | 3/2017 |
| WO | 2008142257 A1 | 11/2008 |

OTHER PUBLICATIONS

Raymond L. Robb: "Hybrid Helicopters: Compounding the Quest for Speed", VERTIFLITE Summer 2006, Jun. 19, 2006 (Jun. 19, 2006), XP055695674, https://web.archive.org/web/2006092704 2104if /http://www.vtol.org/pdf/summer06ro bb.pdf. 13 pages.

"Aerodynamic Trade Study of Compound Helicopter Concepts"; Roche Julian Dec. 1, 2015.—cf. https://commons.erau.edu/cgi/viewcontent.cgi?article=1236&context=edt. 138 pages.

French Search Report for French Application No. FR1913448, Completed by the French Patent Office, dated Aug. 3, 2020, 9 pages.

\* cited by examiner

HYBRID ROTORCRAFT HAVING AT LEAST ONE PUSHER OR PULLER PROPELLER, AND AN ASSOCIATED PILOTING METHOD

CROSS-REFERENCE TO RELATED APPLICATIONS

This application claims priority to French patent application No. FR 19 13448 filed on Nov. 29, 2019, the disclosure of which is incorporated in its entirety by reference herein.

BACKGROUND OF THE INVENTION

(1) Field of the Invention

The present invention relates to the field of rotary-wing aircraft, which are generally referred to as "rotorcraft". A rotorcraft may have at least one main rotor that participates at least in providing lift for the rotorcraft, and at least one tail rotor that participates, for example, in piloting the rotorcraft on a yaw path.

(2) Description of Related Art

A hybrid aircraft that is configured to fly at forward speeds or "forward airspeeds" that are high, e.g. higher than 200 knots (kts), is also known. In order to reach such a forward speed, a hybrid aircraft is equipped with at least one pusher or puller propeller that participates in providing propulsion or traction for the rotorcraft in the air, and in controlling its yaw movement.

The pusher or puller propeller(s) equipping such a hybrid aircraft and the main rotor of such a hybrid aircraft are driven in rotation mechanically via a drive system and via at least one combustion engine. Such architectures for driving pusher or puller propellers in rotation are described, in particular, by the Applicant in Documents WO2008/142257, EP 2 233 396, EP 2 690 011, and EP 3 141 478.

However, stopping rotation of one or more such pusher or puller propellers only, e.g. during a phase enabling passengers to board or to disembark, can be difficult to achieve.

Furthermore, such architectures do not make it possible to obtain speed-of-rotation laws that are mutually independent between the main rotors and the pusher or puller propeller(s).

Moreover, the pusher or puller propeller(s) must be located in regions of the rotorcraft that can be reached by the power transmission drive system.

What is more, such an architecture gives rise to drive systems that are complex, in particular when the rotorcraft has a plurality of pusher or puller propellers. An object of the present invention is thus to propose a rotorcraft that enables the above-mentioned limitations to be overcome.

Thus, an object of the invention is, in particular, to make a hybrid rotorcraft architecture simpler, or indeed more flexible and modular, while also enabling its forward speed to be increased relative to the forward speed of a conventional rotorcraft that is not provided with a pusher or puller propeller.

In addition, Document US 2015/100181 discloses a rotary-wing aircraft provided with an electrified propulsion system. That rotary-wing aircraft has a main rotor 216, and a tail boom carrying an anti-torque tail rotor 220, which is driven by an electric motor 218 that is specific to it. That rotary-wing aircraft is also provided with an auxiliary propulsor rotor 224 that provides the rotary-wing aircraft with thrust augmentation in the form of thrust that is auxiliary to the thrust from the main rotor 216. The main rotor 216 is mechanically coupled to an electric motor 214, which receives its electric power from one or more generators 204a-b. The generator(s) 204a-b is/are driven mechanically by at least one internal combustion engine 202a-b. The auxiliary propulsor rotor 224 is mechanically coupled to an electric motor 222, which receives its electric power from the generator(s) 204a-b.

However, that document does not describe using an internal combustion engine that has an outlet shaft transmitting a drive torque both to the main rotor 216 and also to the anti-torque rotor 220.

In addition, Document CN 108750092 discloses an unmanned drone. That drone has a fuselage 1, a main rotor 401, a tail rotor 501, and fixed wings mounted on a frame 101. For driving the main rotor 401, the drone also has an engine 402 that is connected to a gearbox 403, and an auxiliary generator 404 that is electrically powered by a battery 405.

During the landing or takeoff phases, the main rotor 401 may be driven in rotation by the auxiliary generator 404 only.

As from the drone reaching a certain height in the air, the engine 402 may be started to replace the auxiliary generator 404 and to drive the main rotor 401 in rotation.

The engine 402 then drives both the main rotor 401 and the auxiliary generator 404 so as to enable the battery 405 to be recharged.

However, during all of those flight phases, the tail rotor 501 is driven in rotation by an electric motor 502.

Pusher propellers 302 are mounted on wings 301. To drive those pusher propellers 302, electric motors 303 are also mounted on the wings 301. Such electric motors 303 are then electrically powered by the battery 403.

However, regardless of the flight phase, that document does not describe using an engine having an outlet shaft and at least one power transmission main gearbox connected to said outlet shaft, which shaft is arranged to transmit a drive torque to the tail rotor 501.

The document entitled "Aerodynamic Trade Study of Compound Helicopter Concepts"; ROCHE Julian 2015. —cf. https://commons.erau.edu/cgi/viewcontent.cgi?article=1236&context=edt studies various hybrid or "compound" helicopter concepts. That document indicates that forward airspeeds that are relatively higher are possible with compound helicopters, which use auxiliary propulsion systems and/or fixed wings in order to lighten or "offload" the task of the main rotor, in particular in terms of forward thrust or in terms of lift. However, according to that document, achieving such a desired lightening or offloading often comes at a price and involves tradeoffs between overall energy consumption needs, weight, or forward airspeed. That document does not describe an electric motor, but rather helicopters on which the main rotor is driven by a turbine or turboshaft engine, which is itself mechanically connected to a tail rotor. According to that document, the helicopters mentioned (X3, X2, etc.) have architectures in which the propulsors are dependent on the power plant—in general a turbine or turboshaft engine—that is used for driving the main rotor.

The document entitled "Hybrid Helicopters: Compounding the Quest for Speed", VERTIFLITE, ROBB Raymond, 2006—cf. https://web.archive.org/web/20060927042104if_/http://www.vtol.org/pdf/summer06robb.pdF, retraces the history of certain hybrid or "compound" helicopters, which not only provide a form of support for lift, but also one or more propulsive means, namely helicopters provided with various types of auxiliary propulsion units, such as propellers or turbojets. That document does not describe electric motors. Thus, the helicopters mentioned have architectures in which the propulsors are dependent on the power plant—in general a turbine or turboshaft engine—that is used for driving the main rotor.

Document US 2017/225794 discloses a rotary-wing aircraft 100. That rotary-wing aircraft 100 is provided with a drive system that combines an engine with an electric motor. That system has an engine 202 and an electric motor 208, and a main rotor 102. A first power drive sub-system comprises at least the engine 202 that is coupled to the rotor 5 and that is configured to provide a first power to said rotor. A second power drive sub-system is connected in parallel with the first power drive sub-system and is configured to provide a second power to the rotor 5, when the first power provided by the first power drive sub-system is less than a power demand of the rotor 5.

BRIEF SUMMARY OF THE INVENTION

Thus, the invention provides a rotorcraft including a first power plant, at least one main rotor participating at least in providing lift for the rotorcraft in the air, and at least one tail rotor carried by a tail boom of the rotorcraft, the first power plant including at least one combustion engine, at least one outlet shaft of the combustion engine, and at least one power transmission main gearbox connected to the outlet shaft as arranged to transmit a first drive torque to a main rotor or to the main rotors and to a tail rotor or to the tail rotors.

In accordance with the invention, such a rotorcraft is remarkable in that it further includes:
  at least one pusher or puller propeller independent from the main rotor(s), the pusher or puller propeller(s) participating at least in providing propulsion or traction for the rotorcraft;
  a second power plant including at least one electric motor transmitting a second drive torque to the pusher or puller propeller(s); and
  at least one control member configured to generate a control setpoint or instruction for controlling the electric motor(s).

In other words, such a rotorcraft enables the pusher or puller propeller(s) to be made totally independent of the main rotor(s) and of the tail rotor(s). With such a hybrid rotorcraft architecture, the control setpoint or instruction for controlling the electric motor(s) so as to drive the pusher or puller propellers in rotation may be generated while being decorrelated from a control setpoint or instruction for controlling the main rotor(s).

Furthermore, the profiles of the blades of the main rotor, of the tail rotor, and of the pusher or puller propeller(s) may thus be optimized specifically for each of the functions they perform.

This then results in the possibility of optimizing the acoustic emissions and the efficiency of the pusher or puller propeller(s), e.g. as a function of the flight conditions and/or of the atmospheric conditions.

In addition, the architecture of such a rotorcraft is then readily modulable so as to make it possible to adapt the choice of the power plant or of the main rotors and/or of the presence of the pusher or puller propeller(s), e.g. as a function of a particular mission or of the needs of a particular client.

Furthermore, such a novel rotorcraft architecture makes it possible readily to stop the pusher or puller propeller(s) in such a manner as, for example, to make it easier for a passenger or for passengers to board or to disembark.

In addition, the pusher or puller propellers and the second power plant may be arranged in different regions of the rotorcraft. By way of example, various embodiments may correspond to various variants of the invention. These embodiments may also be mutually combined without going beyond the scope of the invention.

Thus, in a first embodiment, the pusher or puller propellers and the second power plant may be carried by the tail boom and be arranged at a tail stabilizer unit.

The expression "tail stabilizer unit" is used to mean an assembly comprising at least one means for providing stabilization in pitch and/or in yaw. Such an assembly may, for example, comprise a tail fin and/or a pitch stabilizer, sometimes referred to as a "stabilizer" or "horizontal stabilizer" or "tailplane", and/or inclined surfaces.

In other words, such a positioning of the pusher and puller propeller(s) of the second power plant is unrestricted at the tail stabilizer unit of the rotorcraft and may possibly require only very simple modifications to be made to the architecture of a conventional rotorcraft. For example, a portion of a tail stabilizer unit or indeed the entire tail stabilizer unit may be replaced with another tail stabilizer unit including the pusher or puller propeller(s) and the second power plant. The architecture is then "readily" modular.

The rotorcraft may include at least one wing arranged below the main rotor(s) going down along an elevation direction Z parallel to an axis of rotation of the main rotor or to axes of rotation of the main rotors.

In addition, such a wing makes it possible, for example, to improve the lift of the rotorcraft for certain flight phases.

Furthermore, in a second embodiment, the pusher or puller propeller(s) and the second power plant may be carried by a wing arranged below the main rotor(s) going down along an elevation direction Z parallel to an axis of rotation of the main rotor or to axes of rotation of the main rotors.

In this situation, the tail stabilizer unit is then not modified and thus carries at least one tail rotor making it possible, in particular, to control the yaw movement of the rotorcraft. The pusher or puller propellers and the second power plant are arranged below the main rotor(s).

Furthermore, the wing carrying the pusher or puller propellers and the second power plant may be of different shapes and forms. Such a wing may thus be substantially of the monoplane type or it may be of more complex geometry in which a plurality of planes meet at their ends, e.g. to form a "closed wing" such as an "annular wing", a "box wing", or a "joined wing".

In practice, the wing may comprise a left half-wing and a right half-wing arranged respectively on a left side and on a right side of an anteroposterior plane of the rotorcraft, the anteroposterior plane being defined by a midplane extending vertically and between a front region and a rear region of the rotorcraft.

In other words, the wing carrying the pusher or puller propellers and the second power plant may extend substantially transversely on either side of the anteroposterior plane.

In an embodiment of the invention, the pusher or puller propeller(s) may comprise at least two pusher or puller propellers belonging to a first group, the first group being carried by the left half-wing, and the pusher or puller propeller(s) may further comprise at least two pusher or puller propellers belonging to a second group, the second group being carried by the right half-wing.

In this way, each of the first and second groups is arranged on a left or right half-wing.

In another aspect of the invention, the first group of at least two pusher or puller propellers and the second group of at least two other pusher or puller propellers may each have the same number N of pusher or puller propellers.

For example, such a number N may advantageously be equal to 2, or to 3, or indeed to 4.

Advantageously, the first group of at least two pusher or puller propellers and the second group of at least two other pusher or puller propellers may be arranged symmetrically about the anteroposterior plane of the rotorcraft.

Therefore, in addition to the identical number N of pusher or puller propellers on each half-wing, the first and second groups of at least two pusher or puller propellers may be positioned symmetrically relative to each other about the anteroposterior plane.

In another aspect, the combustion engine(s) may be chosen from the group comprising piston engines, rotary engines, and turbine engines.

Such combustion engines make it possible to achieve a long range for a relatively low on-board weight or payload. Preferably, one or two turbine engines or turboshaft engines may be used to guarantee an optimum power level.

The present invention also provides a piloting method for piloting the above-mentioned rotorcraft.

In accordance with the invention, such a piloting method is remarkable in that, in a normal operating mode, the piloting method includes at least one normal control step for controlling the tail rotor(s) so as to generate at least a third torque on a carrier structure of the rotorcraft, and, in an emergency operating mode, the piloting method includes at least one emergency control step for controlling the pusher or puller propellers so as to generate the third torque on the carrier structure of the rotorcraft.

In other words, in the normal operating mode, only the tail rotor(s) is/are used for, for example, controlling a yaw movement of the rotorcraft. In this normal operating mode, the pusher or puller propellers are used only to make it possible to increase the forward speed or "forward airspeed" of the aircraft.

The pusher propeller(s) is/are therefore not, a priori, dimensioned to perform an anti-torque function, but rather the pusher propeller(s) is/are optimized for at least participating in the forward thrust of the rotorcraft. This non-optimized dimensioning of the pusher or puller propeller(s) is, however, sufficient in the event of an emergency and thus, for example, in the event of failure of the tail rotor(s).

In practice, in the emergency operating mode, the third torque may be generated by causing a left thrust from at least one left pusher or puller propeller to vary relative to a right thrust from at least one right pusher or puller propeller, the left pusher or puller propeller(s) and the right pusher or puller propeller(s) being arranged respectively on a left side and on a right side of an anteroposterior plane of the rotorcraft, the anteroposterior plane being defined by a midplane extending vertically and between a front region and a rear region of the rotorcraft.

In other words, in the emergency operating mode corresponding, for example, to a failure of the tail rotor(s), a thrust differential may be achieved between at least one left pusher or puller propeller and at least one right pusher or puller propeller.

As indicated above, the third torque is then generated by the left and right pusher or puller propellers, even though they are not optimized for this anti-torque function.

BRIEF DESCRIPTION OF THE DRAWINGS

The invention and its advantages appear in greater detail from the following description of examples given by way of illustration with reference to the accompanying figures, in which.

DETAILED DESCRIPTION OF THE INVENTION

Elements present in more than one of the figures are given the same references in each of them.

Figure 1:
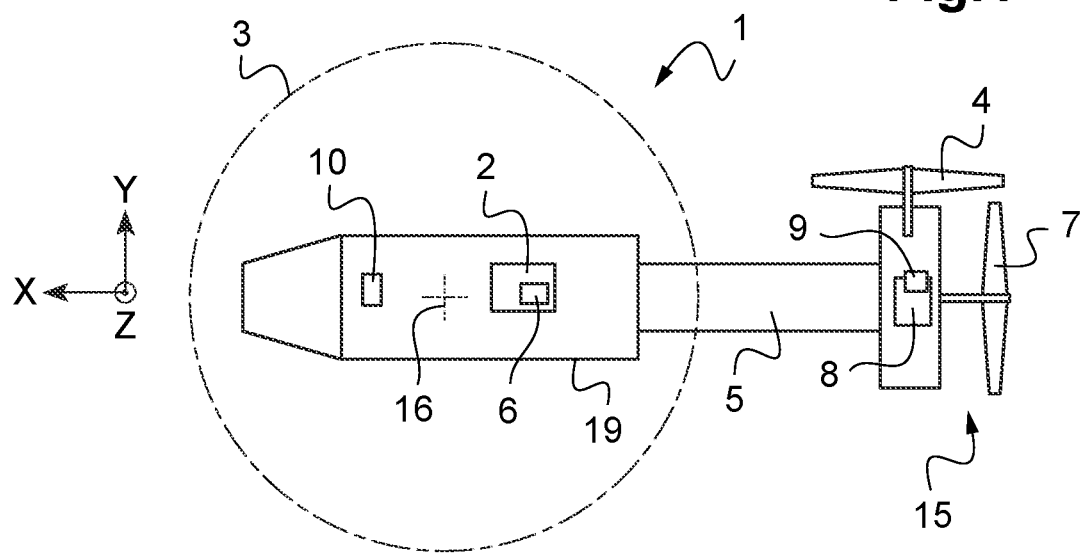
FIG. 1 is a plan view of a first example of a rotorcraft of the invention.
Figure 2:
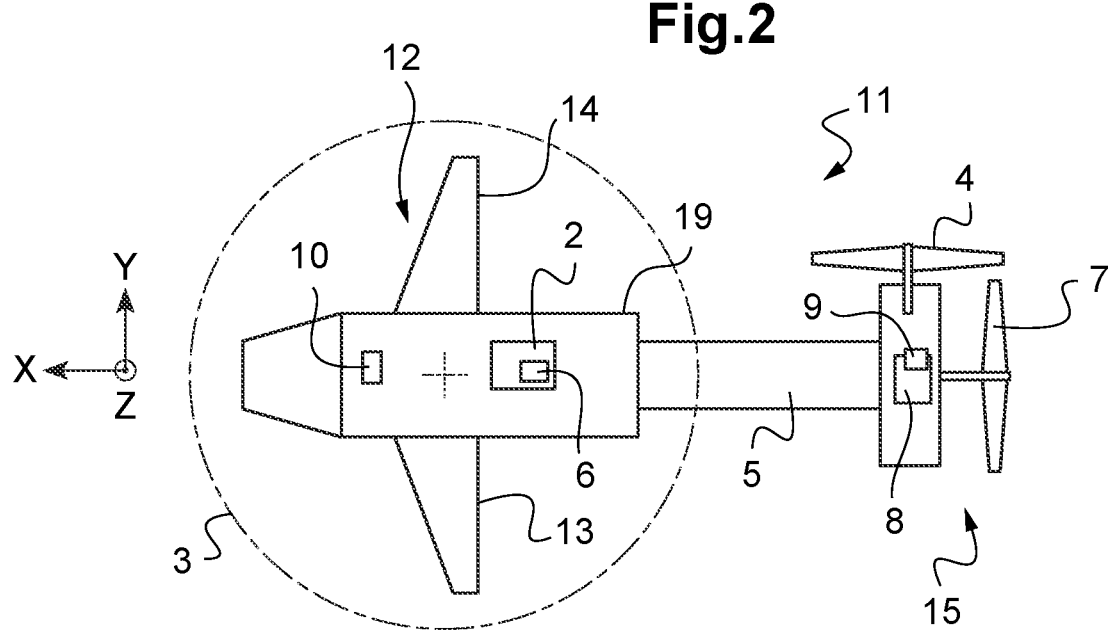
FIG. 2 is a plan view of a second example of a rotorcraft of the invention.
Figure 3:
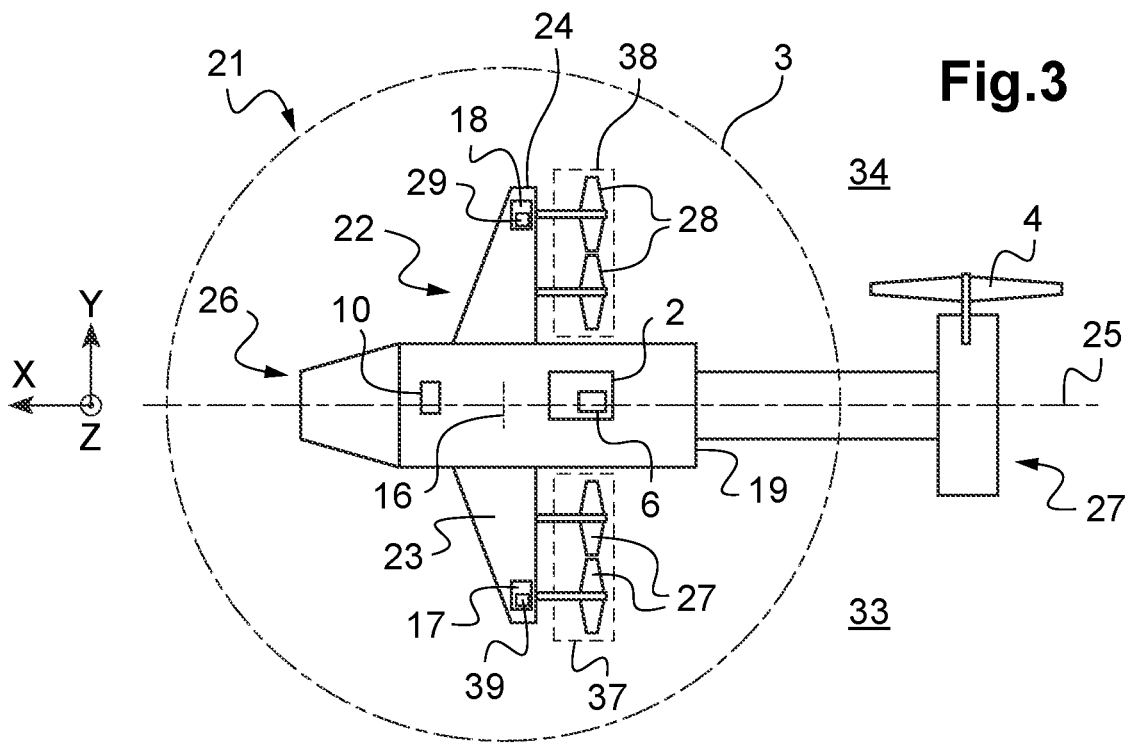
FIG. 3 is a plan view of a third example of a rotorcraft of the invention.

Three mutually orthogonal directions X, Y, and Z are shown in each of the FIGS. 1 to 3.

The first direction X is said to be "longitudinal". The term "longitudinal" relates to any direction parallel to the first direction X.

The second direction Y is said to be "transverse". The term "transverse" relates to any direction parallel to the second direction Y.

Finally, the third direction Z is said to be "in elevation". The term "in elevation" relates to any direction parallel to the third direction Z.

As shown in FIG. 1, the invention thus relates to a rotorcraft 1 including a first power plant 2 mounted on a carrier structure 19, at least one main rotor 3 that participates at least in providing lift for the rotorcraft 1 in the air, and at least one tail rotor 4 that is carried by a tail boom 5 and that makes it possible, in particular, to control the movement of the rotorcraft 1 about its yaw axis.

In addition, the first power plant 2 shown includes at least one combustion engine 6 and makes it possible to transmit a first drive torque to the main rotor 3 and to the tail rotor 4. Such a combustion engine 6 may be chosen, for example, from the group comprising piston engines, rotary engines, and turbine engines.

Regardless of the embodiment, the first power plant 2 may further include at least one outlet shaft of the combustion engine 6 and at least one power transmission main gearbox connected to said outlet shaft. In addition, such a rotorcraft 1 includes a pusher or puller propeller 7 that is independent from the main rotor 3. Such a pusher or puller propeller 7 then participates in providing propulsion or traction for the rotorcraft 1.

Furthermore, the rotorcraft 1 includes a second power plant 8 including at least one electric motor 9 that transmits a second drive torque to the pusher or puller propeller 7.

In a first example of a rotorcraft 1, such a pusher or puller propeller 7 is carried by the tail boom 5 and is arranged at a tail stabilizer unit 15.

The second power plant 8 is also carried by the tail boom 5 and is arranged at the tail stabilizer unit 15.

In addition, the rotorcraft 1 includes at least one control member 10 that is configured to generate a control setpoint or instruction for controlling the electric motor(s) 9. Such a control member 10 is then connected via a wired or wireless connection to a control computer (not shown) that receives control setpoints or instructions generated by a human pilot or an autopilot of the rotorcraft by means of the control member 10. The control computer then generates a piece of control information. This piece of control information is then transmitted to the second power plant 8 to generate the second drive torque that is transmitted to the pusher or puller propeller 7.

As shown in FIG. 2, in a second example of a rotorcraft 11, the carrier structure 19 may also have a wing 12 that extends below the main rotor 3.

In addition, such a wing 12 may extend symmetrically about an anteroposterior plane. This wing 12 may also comprise a left half-wing 13 arranged on a left side of the anteroposterior plane and a right half-wing 14 arranged on a right side of the anteroposterior plane.

Advantageously, such a wing 12 may be removable and be mounted or not mounted on the carrier structure 19 depending on the mission to be flown. Similarly, the pusher or puller propeller 7 and the second power plant 8 may also be arranged in removable manner relative to the tail stabilizer unit 15 of the rotorcraft 11.

Furthermore, in a third example of a rotorcraft 21 that is shown in FIG. 3, at least two pusher or puller propellers 27, 28 and second power plants 17, 18 may be carried by a wing 22 arranged below the main rotor 3 going down along the elevation direction Z parallel to the axis of rotation 16 of the main rotor 3.

Naturally, in another example of a rotorcraft (not shown), a wing may also have a single pusher or puller propeller. Such a wing may then be in the form of a left half-wing and of a right half-wing. The pusher or puller propeller is then arranged on a right or left one of the half-wings, and the left or right other half-wing then has no pusher or puller propeller.

In yet another example of a rotorcraft (not shown), a wing may also have two pusher or puller propellers. Such a wing may also be in the form of a left half-wing and of a right half-wing. A left pusher or puller propeller is then arranged on a left half-wing and a right pusher or puller propeller is then arranged on a right half-wing.

As shown in FIG. 3, such a wing 22 has a left half-wing 23 and a right half-wing 24 arranged respectively on a left side 33 and on a right side 34 of an anteroposterior plane 25 of the rotorcraft 21. Such an anteroposterior plane 25 may be defined as being a midplane extending vertically and between a front region 26 and a rear region 27 of the rotorcraft 21 along the longitudinal direction X.

Furthermore, such a rotorcraft 21 may include firstly a first group 37 of at least two pusher or puller propellers 27, which first group 37 is carried by the left half-wing 23, and secondly a second group 38 of at least two other pusher or puller propellers 28, which second group 38 is carried by the right half-wing 24.

As shown in this third example of a rotorcraft 21, the first group 37 comprises two pusher or puller propellers 27 and the second group 38 comprises two other pusher or puller propellers 28. In other examples of rotorcraft (not shown), the first and second groups 37 and 38 may also comprise three or four pusher or puller propellers 27 and 28 each.

Furthermore, the first group 37 and the second group 38 may advantageously be arranged symmetrically about the anteroposterior plane 25 of the rotorcraft 21.

Figure 4:
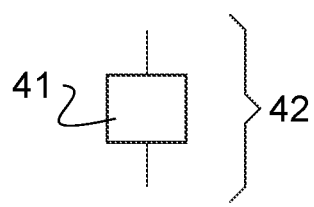
FIG. 4 is a block diagram showing a piloting method of the invention.
Figure 4:
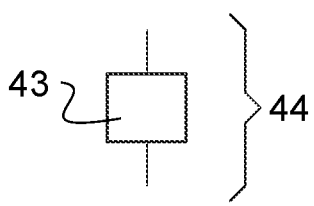

As shown in FIG. 4, the invention also relates to a piloting method for piloting such a rotorcraft 1, 11, 21. Such a method 40 has two operating modes, namely a normal operating mode 42 and, if a failure occurs at the tail rotor 4, an emergency or contingency operating mode 44.

In the normal operating mode 42, the piloting method 40 includes a normal control step 41 for controlling the tail rotor 4 in such a manner as to generate at least a third torque on the carrier structure 19 of the rotorcraft 1, 11, 21, and as to make it possible to control the movements of the rotorcraft 1, 11, 21 about a yaw axis.

Conversely, when a failure is detected at the tail rotor 4, then the piloting method 40 goes over to the emergency operating mode 44.

In this situation, the piloting method 40 then includes at least one emergency control step 43 for controlling the pusher or puller propeller(s) 7, 27, 28 in such a manner as to generate the third torque on said carrier structure 19 of the rotorcraft 1, 11, 21.

Thus, in the emergency operating mode only, the pusher or puller propeller(s) 7, 27, 28 may make it possible to control a yaw path of the rotorcraft 1, 11, 21.

In the emergency operating mode 44, the third torque may thus be generated by causing a left thrust from at least one left pusher or puller propeller 27 to vary relative to a right thrust from at least one right pusher or puller propeller 28.

Conversely, the third torque may also be generated by causing the right thrust from at least one right pusher or puller propeller 28 to vary relative to the left thrust from at least one left pusher or puller propeller 27.

Naturally, the present invention may be subjected to numerous variations as to its implementation. Although several embodiments and implementations are described above, it should readily be understood that it is not conceivable to identify exhaustively all possible embodiments and implementations. It is naturally possible to envisage replacing any of the means described by equivalent means without going beyond the ambit of the present invention.

What is claimed is:

1. A rotorcraft including a first power plant, at least one main rotor participating at least in providing lift for the rotorcraft in the air, and at least one tail rotor carried by a tail boom of the rotorcraft, the first power plant including at least one combustion engine, at least one outlet shaft of the combustion engine, and at least one power transmission main gearbox connected to the outlet shaft as arranged to transmit a first drive torque to the at least one main rotor and to the at least one tail rotor;
   wherein the rotorcraft further includes:
   a wing arranged below the at least one main rotor going down along an elevation direction Z parallel to an axis of rotation of the at least one main rotor;
   a plurality of pusher or puller propellers independent from the first power plant, the at least one main rotor, and the at least one tail rotor, the propellers being directly mounted on a trailing edge of the wing, and the propellers participating at least in providing propulsion or traction for the rotorcraft;
   a second power plant including at least one electric motor to transmit a second drive torque to the propellers and not to either of the at least one main rotor or the at least one tail rotor;
   at least one control member configured to generate a control setpoint for controlling the at least one electric motor, the at least one control member enabling a human pilot or autopilot of the rotorcraft to generate the control setpoint; and
   a control computer connected to the at least one control member to generate a piece of control information transmittable to the second power plant to generate the second drive torque that is transmittable to the propellers.

2. The rotorcraft according to claim 1,
   wherein the second power plant is carried by the wing.

3. The rotorcraft according to claim 1,
wherein the wing comprises a left half-wing and a right half-wing arranged respectively on a left side and on a right side of an anteroposterior plane of the rotorcraft, the anteroposterior plane being defined by a midplane extending vertically and between a front region and a rear region of the rotorcraft; and
the propellers comprise at least two propellers belonging to a first group and at least two other propellers belonging to a second group, the first group being carried by the left half-wing, and the second group being carried by the right half-wing.

4. The rotorcraft according to claim 3,
wherein the first group of at least two propellers and the second group of at least two other propellers each have the same number N of propellers.

5. The rotorcraft according to claim 4,
wherein the first group of at least two propellers and the second group of at least two other propellers are arranged symmetrically about the anteroposterior plane of the rotorcraft.

6. The rotorcraft according to claim 1,
wherein the at least one combustion engine is chosen from the group comprising piston engines, rotary engines, and turbine engines.

7. A piloting method for piloting the rotorcraft according to claim 1,
wherein, in a normal operating mode, the piloting method includes at least one normal control step for controlling the at least one tail rotor so as to generate at least a third torque on a carrier structure of the rotorcraft, and, in an emergency operating mode, the piloting method includes at least one emergency control step for controlling the propellers so as to generate the third torque on the carrier structure of the rotorcraft.

8. The piloting method according to claim 7,
wherein, in the emergency operating mode, the third torque is generated by causing a left thrust from at least one left propeller to vary relative to a right thrust from at least one right propeller, the at least one left propeller and the at least one right propeller being arranged respectively on a left side and on a right side of an anteroposterior plane of the rotorcraft, the anteroposterior plane being defined by a midplane extending vertically and between a front region and a rear region of the rotorcraft.

9. A rotorcraft comprising:
a first power plant;
at least one main rotor participating at least in providing lift for the rotorcraft in the air;
at least one tail rotor carried by a tail boom of the rotorcraft,
the first power plant including at least one combustion engine, at least one outlet shaft of the combustion engine, and at least one power transmission main gearbox connected to the outlet shaft as arranged to transmit a first drive torque to the at least one main rotor and to the at least one tail rotor;
a wing arranged below the at least one main rotor going down along an elevation direction Z parallel to an axis of rotation of the at least one main rotor;
a plurality of pusher or puller propellers independent from the first power plant, the at least one main rotor, and the at least one tail rotor, the propellers being directly mounted on a trailing edge of the wing, and the propellers participating at least in providing propulsion or traction for the rotorcraft;
a second power plant including at least one electric motor to transmit a second drive torque to the propellers and not to either of the at least one main rotor or the at least one tail rotor;
at least one control member configured to generate a control setpoint for controlling the at least one electric motor while being decorrelated from a control setpoint for controlling the at least one main rotor and/or the at least one tail rotor, the at least one control member enabling a human pilot or autopilot of the rotorcraft to generate the control setpoint for controlling the at least one electric motor; and
a control computer connected to the at least one control member to generate a piece of control information transmittable to the second power plant to generate the second drive torque that is transmittable to the propellers.

10. The rotorcraft according to claim 9,
wherein the second power plant is carried by the wing.

11. The rotorcraft according to claim 9,
wherein the wing comprises a left half-wing and a right half-wing arranged respectively on a left side and on a right side of an anteroposterior plane of the rotorcraft, the anteroposterior plane being defined by a midplane extending vertically and between a front region and a rear region of the rotorcraft; and
wherein the propellers comprise at least two propellers belonging to a first group and at least two other propellers belonging to a second group, the first group being carried by the left half-wing, and the second group being carried by the right half-wing.

12. The rotorcraft according to claim 11,
wherein the first group of at least two propellers and the second group of at least two other propellers each have the same number N of propellers.

13. The rotorcraft according to claim 12,
wherein the first group of at least two propellers and the second group of at least two other propellers are arranged symmetrically about the anteroposterior plane of the rotorcraft.

14. The rotorcraft according to claim 9,
wherein the at least one combustion engine is chosen from the group comprising piston engines, rotary engines, and turbine engines.

15. A rotorcraft comprising:
a first power plant;
a main rotor for providing lift for the rotorcraft in the air;
a tail rotor carried by a tail boom of the rotorcraft;
the first power plant including a combustion engine having an outlet shaft, and a power transmission main gearbox connected to the outlet shaft for transmitting a first drive torque to the main rotor and to the tail rotor;
a wing arranged below the main rotor going down along an elevation direction Z parallel to an axis of rotation of the main rotor;
a plurality of pusher or puller propellers independent from the first power plant, the main rotor, and the tail rotor, the propellers being directly mounted on a trailing edge of the wing, and the propellers capable of providing propulsion or traction for the rotorcraft;
a second power plant including an electric motor for transmitting a second drive torque to the propellers and not to either of the main rotor or the tail rotor;
a control member for generating a control setpoint for controlling the electric motor, the control member enabling the rotorcraft to generate the control setpoint and to generate a piece of control information transmittable to the second power plant to generate the second drive torque for the propellers.

16. The rotorcraft according to claim 15, wherein the second power plant is carried by the wing.

* * * * *